United States Patent [19]

Sumiyoshi

[11] Patent Number: 4,647,970
[45] Date of Patent: Mar. 3, 1987

[54] SYNC SIGNAL REPRODUCING CIRCUIT IN TELEVISION RECEIVERS

[75] Inventor: Hajime Sumiyoshi, Fukaya, Japan

[73] Assignee: Kabushiki Kaisha Toshiba, Kawasaki, Japan

[21] Appl. No.: 811,735

[22] Filed: Dec. 20, 1985

[30] Foreign Application Priority Data

Dec. 20, 1984 [JP] Japan .................. 59-267349

[51] Int. Cl.$^4$ .................................. H04N 5/06
[52] U.S. Cl. ...................... 358/150; 358/158; 358/159
[58] Field of Search ............. 358/148, 149, 150, 153, 358/154, 155, 158, 159

[56] References Cited

U.S. PATENT DOCUMENTS

| | | | |
|---|---|---|---|
| 3,751,588 | 8/1973 | Eckenbrecht | 358/158 |
| 4,245,251 | 1/1981 | Steckler et al. | 358/158 |
| 4,251,833 | 2/1981 | Fernsler et al. | 358/158 |
| 4,498,103 | 2/1985 | Aschwanden | 358/158 |
| 4,536,794 | 8/1985 | Fernsler et al. | 358/158 |

FOREIGN PATENT DOCUMENTS 2123246  1/1984  United Kingdom .

Primary Examiner—James J. Groody
Assistant Examiner—Michael D. Parker
Attorney, Agent, or Firm—Oblon, Fisher, Spivak, McClelland & Maier

[57] ABSTRACT

A sync signal reproducing circuit for television receivers. The circuit comprises; a composite sync signal source for supplying a composite sync signal, a voltage controlled oscillator, a first frequency divider connected to the voltage controlled oscillator for dividing an oscillating frequency of the voltage controlled oscillator, a second frequency divider connected to the first frequency divider for generating a horizontal sync scan signal by dividing the divided output frequency further, a horizontal deflection circuit connected to the second frequency divider, the horizontal deflection circuit producing a flyback pulse referring to the horizontal sync scan signal, a downcounter connected to the first frequency divider for generating a vertical sync scan signal by counting down the divided output frequency, a phase detecting circuit connected to the composite sync signal source and the horizontal deflection circuit for performing a phase detection of the composite sync signal and a sawtooth signal obtained by converting a waveform of the flyback pulse, a connection circuit connected between the phase detecting circuit and voltage controlled oscillator for supplying a phase detecting output signal detected by the phase detecting circuit to the voltage controlled oscillator as a control signal, and a mask signal producing circuit connected between the downcounter and the phase detecting circuit for generating a mask signal which masks the phase detecting circuit for a fixed time on the basis of the count output from the downcounter.

2 Claims, 4 Drawing Figures

SYNC SIGNAL REPRODUCING CIRCUIT IN TELEVISION RECEIVERS

FIELD OF THE INVENTION

The present invention relates to a sync signal reproducing circuit in television receivers, and more particularly to a countdown type sync signal reproducing circuit in television receivers.

DESCRIPTION OF THE PRIOR ART

As a so-called countdown system scanning sync signal reproducing circuit to be used in television receivers, there is known in a prior art system such as "A highly stable integrated sync system", IEEE TCE Vol. CE-24, No. 3, August 1978 by Milton Wilcox.

In a conventional sync signal reproducing circuit as described above, the phase difference between a composite sync signal to be extracted from the received television signals and a horizontal scan sawtooth signal to be obtained by integrating a pulse on the secondary winding of a flyback transformer is detected, a voltage controlled oscillator (hereinafter called VCO) is controlled by the phase difference signal, the oscillation output frequency of the VCO is suitably divided into the frequency of a vertical sync signal, and the divided signals are counted down by a counter to obtain a vertical scan sync signal.

The counter is reset by reset pulse to be produced synchronously at falling phase of the divided output pulse of the VCO within the period of vertical detection pulse to be obtained in a vertical sync detection circuit.

By the way, a starting time of the vertical sync signal in composite sync signal is different between odd fields and even fields as well known. In a conventional horizontal sync signal reproducing circuit, therefore, the phase difference signal varies so that the pulse width of the vertical sync signal also varies. Variation of the pulse width of the vertical sync signal produces phase shift at a starting of the vertical scan. The variation of the pulse width of the vertical sync signal, therefore, causes a defect of damaging the picture quality due to generation of sway and an incomplete interlace of the whole television picture.

SUMMARY OF THE INVENTION

An object of the present invention is to provide a countdown type sync signal reproducing circuit in television receivers.

The and other objects are achieved in the sync signal reproducing circuit in television receivers of the present invention which includes a composite sync signal source for supplying a composite sync signal, a voltage controlled oscillator, a first frequency divider connected to the voltage controlled oscillator for dividing an oscillating frequency of the voltage controlled oscillator, a second frequency divider connected to the first frequency divider for generating a horizontal sync scan signal by dividing the divided output frequency further, a horizontal deflection circuit connected to the second frequency divider, the horizontal deflection circuit producing a flyback pulse referring to the horizontal sync scan signal, a downcounter connected to the first frequency divider for generating a vertical sync scan signal by counting down the divided output frequency, a phase detecting circuit connected to the composite sync signal source and the horizontal deflection circuit for performing a phase detection of the composite sync signal and a sawtooth signal obtained by converting a waveform of the flyback pulse, a connection circuit connected between the phase detecting circuit and voltage controlled oscillator for supplying a phase detecting output signal detected by the phase detecting circuit to the voltage controlled oscillator as a control signal, and a mask signal producing circuit connected between the downcounter and the phase detecting circuit for generating a mask signal which masks the phase detecting circuit for a fixed time on the basis of the count output from the downcounter.

Additional objects, advantages, and features of the present invention will become apparent to persons skilled in the art from a study of the following description and of the accompanying drawings, in which:

DESCRIPTION OF THE PREFERRED EMBODIMENTS

Figure 1:
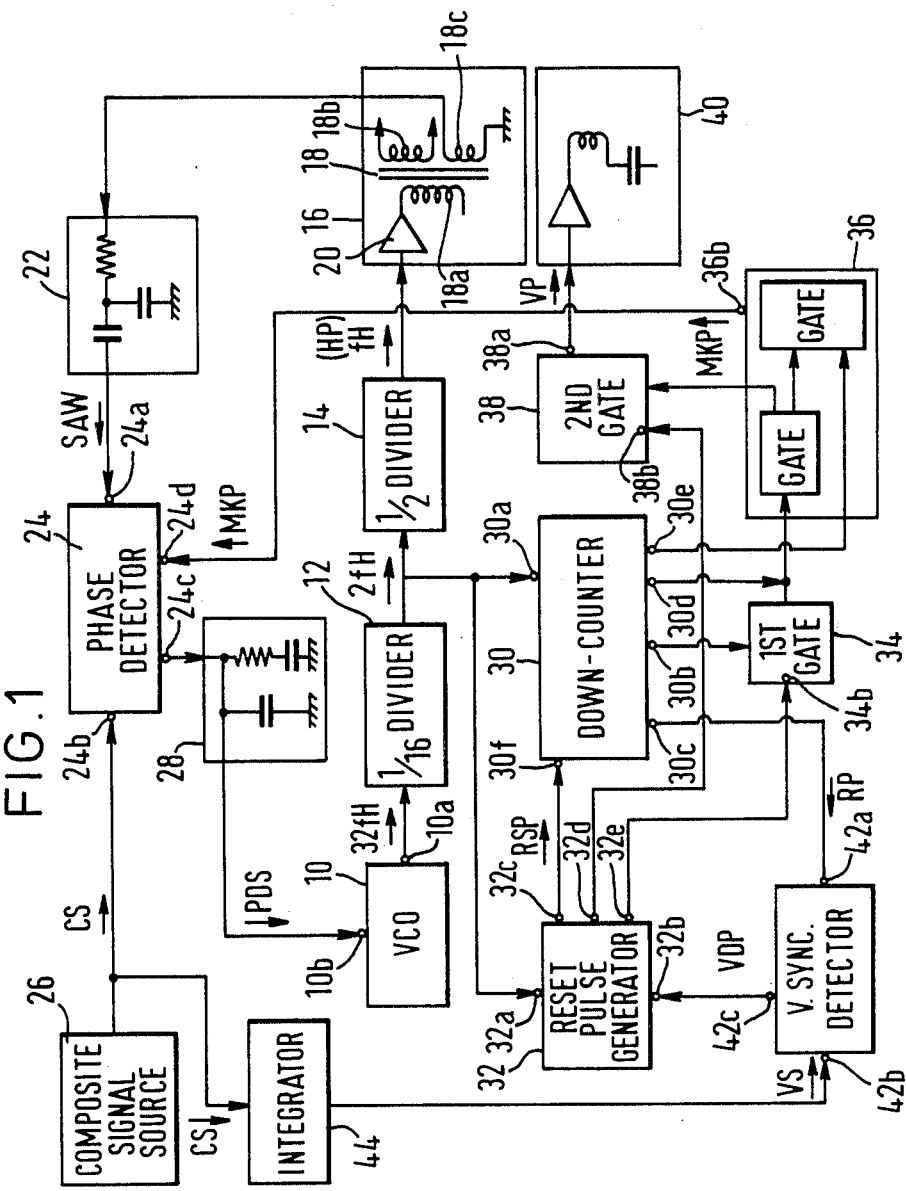
FIG. 1 is a block diagram showing an embodiment of a sync signal reproducing circuit in television receivers according to the invention.

The present invention will now be described in detail with reference to the accompanying drawings, namely, FIGS. 1 to 4. Throughout the drawings, like reference numerals and letters are used to designate like or equivalent elements for the sake of simplicity of explanation.

Referring now to FIG. 1, there is shown an embodiment of a sync signal reproducing circuit in television receivers constructed according to the present invention.

In FIG. 1, an output terminal 10a of a VCO 10 is connected with a horizontal deflection circuit 16 through a first and a second frequency divider 12 and 14. The horizontal deflection circuit 16 is provided with a flyback transformer 18 and its primary winding 18a is connected with the second frequency divider 14 through an amplifier 20. A secondary winding 18b of the flyback transformer 18 is connected an anode (not shown in the drawing) of a cathoderay tube (referred hereinafter as CRT). The flyback transformer 18 is further provided with a detection winding 18c. The detection winding 18a is connected with an input terminal 24a of a phase detecting circuit 24 through a waveform converting circuit 22. An input terminal 24b of the phase detecting circuit 24 is connected with a composite sync signal source 26 and an output terminal 24c of the phase detecting circuit 24 is connected with a control terminal 10b of the VCO 10 through a low pass filter (hereinafter referred as LPF) 28. That is, as is well known, the VCO 10 and the phase detecting circuit 24 constitute a part of a phase locked loop (hereinafter referred as PLL) to perform an automatic phase control for horizontal scan pulse signal HP to be supplied to the horizontal deflection circuit 16.

The output terminal of the first frequency divider 12 is connected with the second frequency divider 14 and also it is connected with a data input terminal 30a of a downcounter 30 and a clock terminal 32a of a reset pulse producing circuit 32. The downcounter 30 is provided with a first through a fourth output terminals 30b, 30c, 30d and 30e. The first output terminal 30b is connected with a vertical deflection circuit 40 through a first gate circuit 34, a mask signal producing circuit 36, and a second gate circuit 38. The second output terminal 30c of the downcounter 30 is connected with an input terminal 42a of a vertical sync detecting circuit 42. An input terminal 42b of the vertical sync detecting circuit 42 is connected with the composite sync signal source 26 through an integrating circuit 44 for performing a vertical sync isolation and the output terminal 42c is connected with the data input terminal 32b of the reset pulse producing circuit 32.

The reset pulse producing circuit 32 is provided with a first through a third output terminals 32c, 32d, and 32b and these terminals are connected respectively with a reset terminal 30f of the downcounter 30 and respective second input terminals 34b and 38b of the first gate circuit 34 and the second gate circuit 38. Also, an output terminal 36a of the mask signal producing circuit 36 is connected with a control input terminal 24d of the phase detecting circuit 24.

Figure 2:
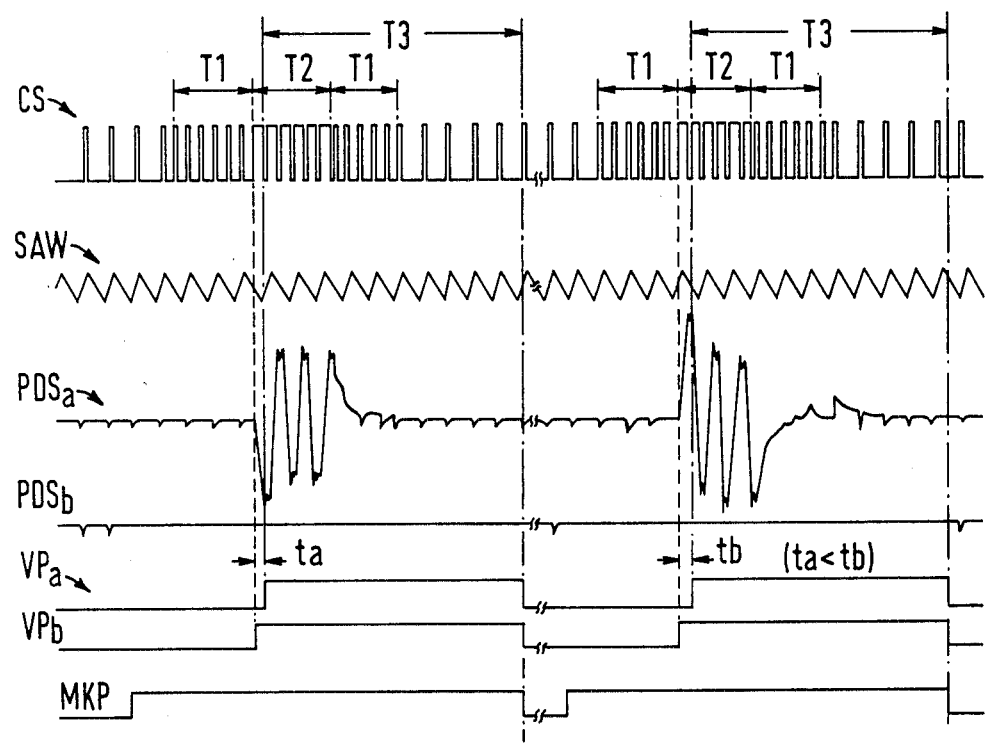
FIG. 2 shows timing charts for explaining the operation of the block diagram of FIG. 1.
Figure 3:
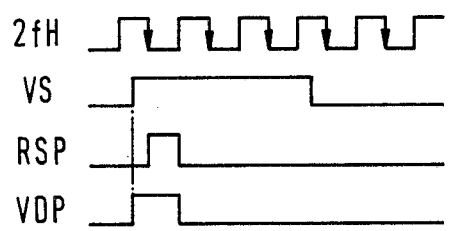
FIG. 3 shows timing charts for explaining the control of the downcounter 30 in FIG. 1.

Referring now to the timing charts in FIGS. 2 and 3, the operation of the sync signal reproducing circuit in FIG. 1 is described. The VCO 10 oscillates a frequency signal of NfH (N; an optional number, fH; horizontal scan frequency), for example, 32fH. This oscillation signal NfH (32fH) is divided into 1/n (1/16) (n; a number less than N) by the first frequency divider 12, and a primary divided signal having the frequency 2fH is divided into ½ by the second frequency divider 14 and thus a secondary divided signal having the horizontal scan frequency fH, that is, the horizontal scan signal HP of the CRT can be obtained. This horizontal scan signal HP with the frequency fH is guided to a horizontal deflection coil (not shown in the drawing) of the CRT through the horizontal deflection circuit 16 to allow the CRT to perform horizontal scan. Actually, the state of the signal scanning through the CRT is detected by the detection winding 18c of the flyback transformer 18 and after converted it into a sawtooth signal SAW as shown in FIG. 2 through an integration by a waveform conversion circuit 22. The sawtooth signal SAW is input in the phase detection circuit 24 and is compared its phase with the composite sync signal CS (see FIG. 2) which is another input signal.

In the composite sync signal CS to be used in a television boardcast, as is well known, the starting phase of the horizontal sync pulse time T2 is different approximately 0.5fH minutes in one field (hereinafter called the first field) and the next field (hereinafter called the second field). As described later, the output, that is, the phase detection output signal PDS of the phase detecting circuit 24 is masked by a mask signal MKP to be given from the mask signal producing circuit 36 to the control input terminal 24d for a fixed time. Assuming that the phase detecting circuit 24 is always operated, the polarity of the phase detection output signal PDS to be obtained in the vertical sync pulse starting part in the first field and the vertical sync pulse starting part in the second field becomes reverse as shown with PDSa in FIG. 2.

The downcounter 30 counts down the primary divided signal 2fH and is reset by a reset pulse RSP supplied from the reset pulse producing circuit 32 to its reset terminal. The vertical sync detecting 42 becomes an H level at a rising phase of vertical sync signal VS to be supplied from the integrating circuit 44. The vertical sync detecting 42 then generates a vertical sync detecting pulse VDP which becomes an L level at a falling phase of a reception RP to be supplied from the second output terminal 30c of the downcounter 30 and inputs in the data input terminal 32b of the reset pulse producing circuite 32. The reception pulse RP is a pulse to be given from the downcounter 30 to the vertical sync detecting circuit 42 for eliminating disturbance such as noises and securing the stability of vertical synchronization in the direct synchronizing system and for setting a fixed time after a vertical sync signal VS is input as a vertical sync signal reception time (V sync window).

As shown in FIG. 3, the reset pulse producing circuit 32 produces a reset pulse RSP which becomes an H level at a falling phase of the primary divided signal 2fH to be applied to the clock terminal 32a during the vertical sync detecting pulse VDP is input and applies it to the reset terminal 30f of the downcounter 30.

Accordingly, the downcounter 30 starts counting of the primary divided signal 2fH at the time when the primary divided signal 2fH is applied, that is, at the rising phase of reset pulse RSP, continues countdown operation for a fixed time, and generates a vertical sync scan signal VP as shown in FIG. 2. Therefore, a rising phase of the vertical sync scan signal VP is synchronized with the falling phase of the primary divided signal 2fH and the signal width also becomes the multiple of integer and it is constant. This vertical sync scan signal VP is supplied to the vertical deflection circuit 40 and is used for synchronization of vertical scan of the CRT.

As described above, assuming that the phase detecting circuit 24 is always operated and the polarity of the phase detection output signal PDS becomes reverse in the first field and the second field as shown with PDSa in FIG. 2, the phase of oscillation output 32fH of the VCO 10 is shifted for each polarity variation past of the phase detection output signal PDSa, and as shown with VPa in FIG. 2, the rising phase is shifted from the equivalent pulse time T1 as shown with ta and tb (ta<tb) resulting in causing a problem as described in the item of "Description of the Prior Art".

However, the mask signal producing circuit 36 connected with the downcounter 30 receives the count value at a fixed count stage in the downcounter 30 which is supplied from the third and the fourth output terminal 30c and 30d and generates the mask signal MKP of the signal width from the starting time of the equivalent pulse time T1 to the finishing time of the vertical sync scan signal VP. This mask signal MKP is applied to the control input terminal 24d of the phase detecting circuit 24 to mask (stop) phase detecting operation of the phase detecting circuit 24. This masking time is set to the time such as 257th-0th-10th horizontal time of the composite sync signal CS.

Accordingly, as shown with PDSb in FIG. 2, the phase detecting output signal PDS to be output from the phase detecting circuit 24 is held at 0 level during masking, and it is prevented to perform an erroneous phase control to the VCO 10 when compared with the phase detecting output PDSa. Further, the mask signal MSK masks the H level period of the vertical sync scan signal VP so that the vertical and horizontal sync scan signals HP and VP are prevented from being affected by a disturbance such as noises to be superposed on the composite sync signal CS during this time and stabilized. Therefore, even if the free running frequency of the VCO 10 is slightly shifted from a specified oscillating frequency 32fH, the signal width of the vertical sync scan signal VP is held uniform. As the result, the vertical sync scan signal VP rises always at a fixed phase and a correct interlace operation is performed in vertical scan of the CRT.

Figure 4:
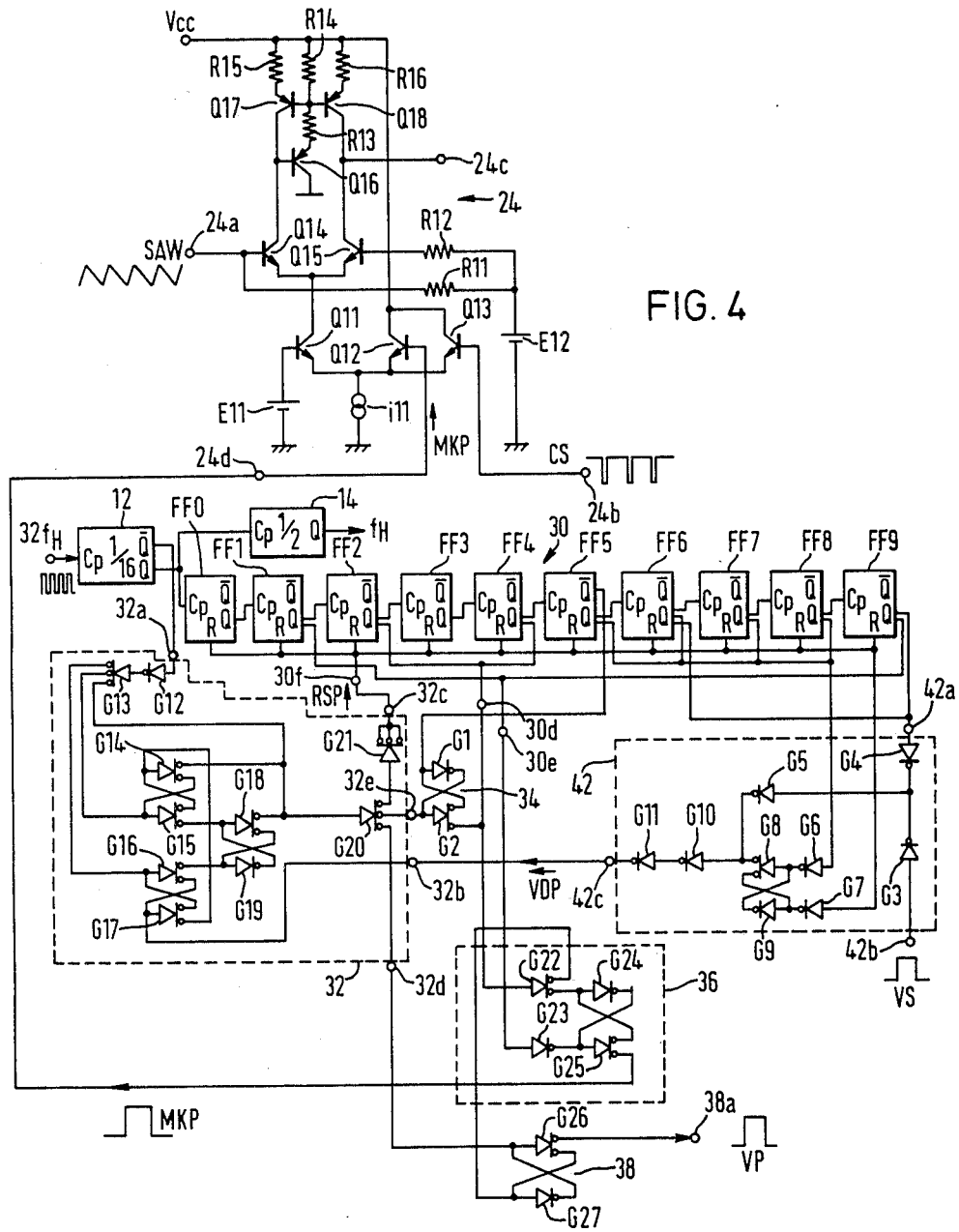
FIG. 4 is a circuit diagram showing in detail the block diagram of FIG. 1.

Referring now to FIG. 4, there is shown a circuit diagram indicating partially a detail of FIG. 1.

In FIG. 4, the numeral 12 is a first frequency divided which receives the oscillation output of 32fH to be oscillated from a VCO (now shown in the drawing). The output 2fH of the frequency divider 12 is input in a second frequency divider 14 for obtaining a horizontal sync scan signal HP and also it is input in a downcounter 30 for obtaining a vertical sync pulse VP. The downcounter 30 is constituted of flip-flop circuits FF0 to FF9 and gate circuits G1, G2, G26 and G27. The numeral 42 is a vertical sync detecting circuit where a vertical sync signal VS separated from a composite sync signal Sc in the integrating circuit (not shown, see the numeral 44 in FIG. 1) is input through an input terminal 42b and a reception pulse RP from the downcounter 30 is given to an input terminal 42a. This vertical sync detecting circuit 42 is constituted of gate circuits G3 to G11 and a vertical sync detecting pulse VDP is output to an output terminal 42c.

The vertical sync detecting pulse VDP is applied to an input terminal 32b of a reset pulse producing circuit 32. To the input terminal 32a of the reset pulse producing circuit 32, the pulse of the primary divided signal 2fH from the first frequency divider 12 is given. The reset pulse producing circuit 32 is constituted of gate circuits G12 to G21. At a falling phase of the first pulse of the primary divided signal 2fH to be applied after rising of vertical sync detecting pulse VDP, the reset pulse RSP of a fixed width is output and applied to the reset terminal 30f of the downcounter 30. The downcounter 30 outputs a vertical sync scan signal VP of a fixed width to the output terminal 38a of the second gate circuit 38 after reset pulse RSP is given. This vertical sync scan signal VP is used for operating a vertical deflection circuit (not shown in the drawing, see the numeral 40 in FIG. 1).

To the downcounter 30, a mask signal producing circuit 36 is connected. This mask signal producing circuit 36 receives the output of flip-flop circuits FF2, FF4 and gate circuit G2, flip-flop circuits FF1, FF9 and generates a mask signal MKP from the equivalent pulse time T1 provided before the vertical sync pulse time T2 in the composite sync signal CS to the presenting period T3 of the vertical sync scan signal VP (refer to FIG. 2). The mask signal producing circuit 36 is constituted of gate circuits G22 to G25 and its output mask signal MKP is given to the control input terminal 24d of the phase detecting circuit 24.

In case of the phase detecting circuit 24, the composite sync signal CS is input in the input terminal 24b, a sawtooth signal SAW made by integrating flyback pulses detected by the horizontal deflection circuit (not shown in the drawing, see the numeral 16 in FIG. 1) is input in the input terminal 24a, and a phase detecting output signal PDS proportional to the phase difference of both input signals is output from the output terminal 24c. The phase detecting circuit 24 is provided with transistors Q11, Q12, and Q13 with their emitters commonly connected to the constant current source i11. To the base of the transistor Q13, the composite sync signal CS is given and to the base of the transistor Q12, the mask signal MKP is given. Also, to the base of the transistor Q11, the base bias power supply E11 is connected. The collectors of the transistors Q12 and Q13 are connected to the power supply Vcc and the collector of the transistor 11 is connected to the common emitter of the transistors Q14 and Q15. The bases of the transistors Q14 and Q15 are connected respectively to the bias power supply E12 through the resistors R11 and R12 and to the base of the transistor Q14, the sawtooth signal SAW is given. The transistors Q11 to Q15 constitutes a multiplier and the collector of the transistor Q15 is connected to the output terminal 24C and also it is connected to the collector of the transistor Q18. The collector of the transistor Q14 is connected to the collector of the transistor Q17 and to the base of the transistor Q16. The transistors Q16, Q17, and Q18 constitute a load circuit. The collector of the transistor Q16 is grounded, the emitter is connected to each base of the transistor Q17 and Q18 through resistor 13 and further, it is connected to the power supply Vcc through resistor 14. The emitters of the transistors Q17 and Q18 are connected to the power supply through resistors R15 and R16 respectively.

What is claimed is:

1. A sync signal reproducing circuit for television receivers comprising:
 a composite sync signal source for supplying a composite sync signal;
 a voltage controlled oscillator means;
 a first frequency dividing means connected to said voltage controlled oscillator means for dividing an oscillating frequency of said voltage controlled oscillator;
 a second frequency dividing means connected to said first frequency dividing means for generating a horizontal sync scan signal by dividing the divided output frequency further;
 a horizontal deflection circuit means connected to said second frequency dividing means, said horizontal deflection circuit means producing a flyback pulse referring to the horizontal sync scan signal;
 a downcounter means connected to said first frequency dividing means for generating a vertical sync scan signal by counting down the divided output frequency;
 a phase detecting circuit means connected to said composite symc signal source and said horizontal deflection circuit for performing a phase detection of the composite sync signal to be given from said composite sync signal source and a sawtooth signal obtained by converting a waveform of the flyback pulse from said horizontal deflection circuit; and
 a connection circuit means connected between said phase detecting circuit means and said voltage controlled oscillator means for supplying a phase detecting output signal detected by said phase detecting circuit means to said voltage controlled oscillator means as a control signal;
 a mask signal producing circuit means connected between said downcounter means and said phase detecting circuit means for generating a mask signal which masks said phase detecting circuit means for a fixed time on the basis of the count output from said downcounter means.

2. A sync signal reproducing circuit in television receivers according to claim 1, wherein the mask signal to be generated by said mask signal producing circuit means is a signal from the start of equalizing pulses provided before the vertical sync pulses in the composite sync signal to the finishing time of the vertical sync scan signal to be generated by said downcounter means.

* * * * *